United States Patent [19]
Torme et al.

[11] 3,766,680
[45] Oct. 23, 1973

[54] COMBINED BOBBER AND HOOK SETTING MECHANISM

[75] Inventors: Albert Torme, Chicago; Jerome Theodore Wolfson, Glencoe, both of Ill.

[73] Assignee: Business Builders International, Inc., Chicago, Ill.

[22] Filed: Sept. 20, 1972

[21] Appl. No.: 290,458

[52] U.S. Cl. .................................................. 43/16
[51] Int. Cl. ............................................. A01k 97/12
[58] Field of Search ............................ 43/15, 16, 17

[56] References Cited
UNITED STATES PATENTS

| | | | |
|---|---|---|---|
| 2,914,879 | 12/1959 | Humes et al. | 43/17 |
| 2,786,294 | 3/1957 | Whitacre | 43/17 |
| 2,712,194 | 7/1955 | Stefano | 43/15 |
| 2,147,917 | 2/1939 | Noren | 43/15 |

Primary Examiner—Louis G. Mancene
Assistant Examiner—J. Q. Lever
Attorney—Jack E. Domink et al.

[57] ABSTRACT

There is disclosed an improved combination fishing bobber and hook setting mechanism of the type having a spring loaded shaft mounted within a sleeve, the shaft having an eye hook at its lower end for supporting a fishing line and the upper portion of the shaft including the shaft's setting means for setting the shaft in the lower fishing position, the sleeve supporting a bobber float thereabout in removably engageable relation, wherein the shaft includes an extension portion extending upwardly from the top end of the sleeve, and the extension portion includes signal means for indicating actuation of the spring loaded shaft within the sleeve.

1 Claim, 9 Drawing Figures

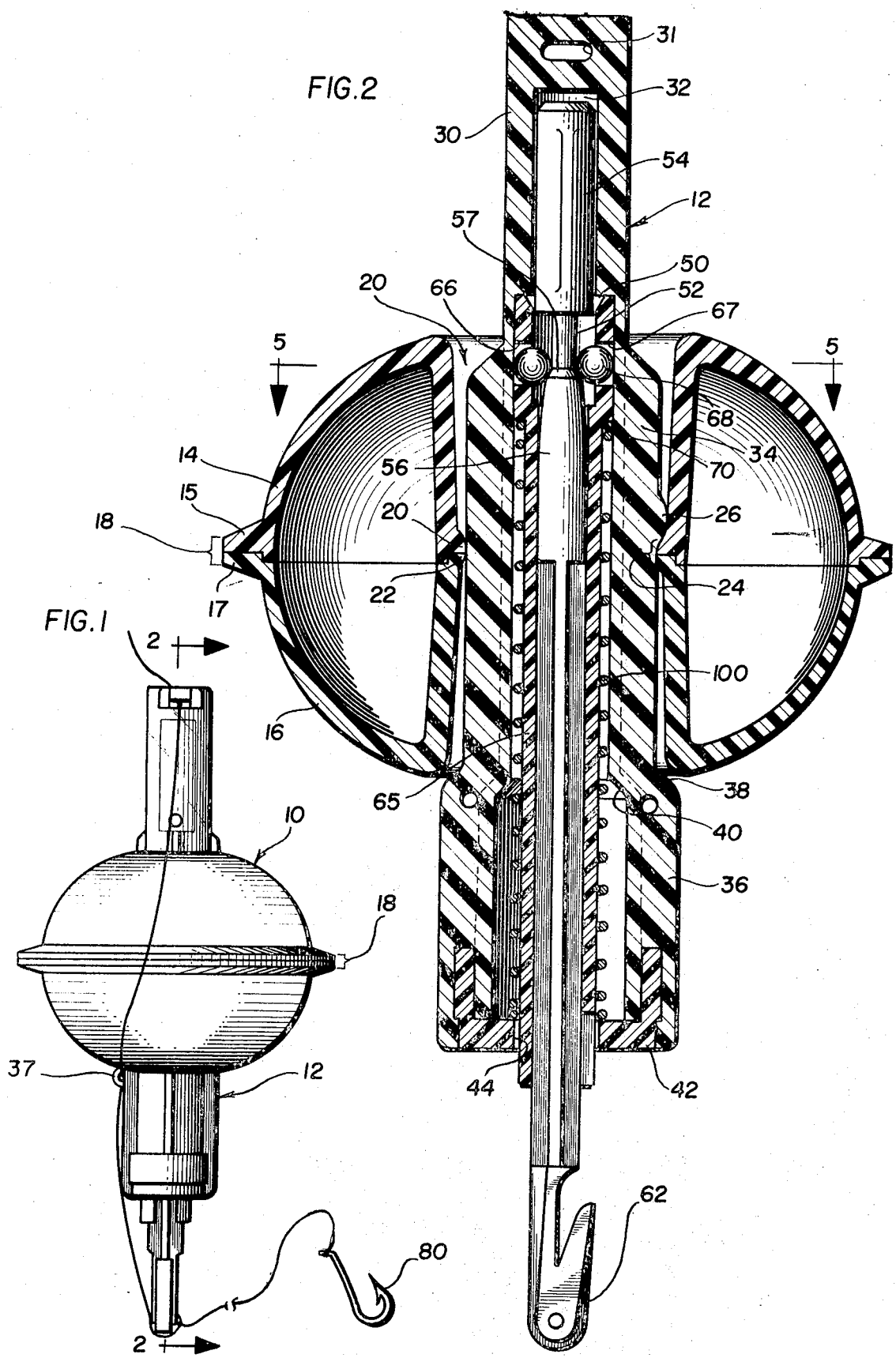

Patented Oct. 23, 1973

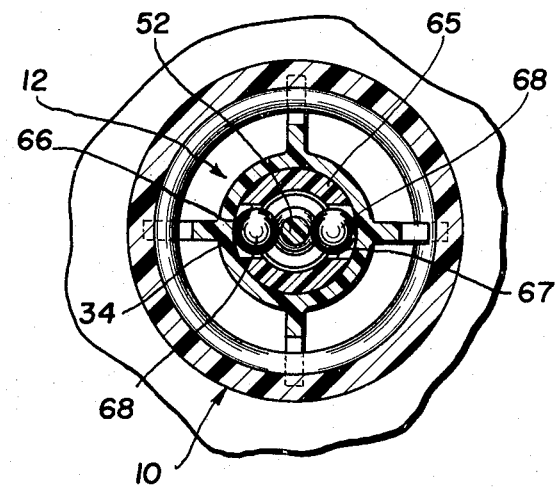
FIG.5
FIG.6
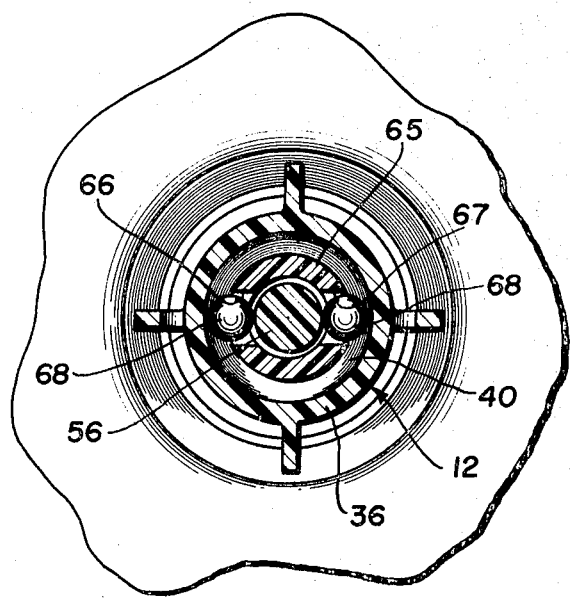
FIG.7
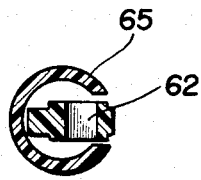
FIG.8
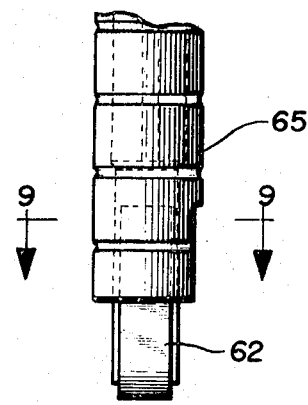
FIG.9
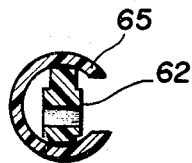

COMBINED BOBBER AND HOOK SETTING MECHANISM

BACKGROUND OF THE INVENTION

A wide variety of devices and mechanisms have heretofore been proposed for automatically setting a fish hook in the fish's mouth when the fish has taken the fish bait. Obviously, the advantage of such a mechanism is the fact, that depending upon the setting of the actuation mechanism, the fish hook will be very quickly and accurately set into the fish's mouth immediately upon the fish taking the bait. As is customarily known in the fishing world, generally the operator of the fishing pole must be able to sense, or at least determine, that a fish is nibbling on the bait, after which it is the operator's task to pull back on the fishing pole, thereby pulling back on the fishing line and hook and as a result, setting the hook into the fish in order to permit the removal thereof from the water.

A variety of prior art patents are available for demonstrating the state of the art and thereby showing a number of similar type line fish bobber and hook setting devices. For example, U.S. Pat. No. 2,575,852, shows a bobber which incorporates a spring mechanism associated with the fishing line adjacent the fish hook end of the line, whereby once the fish nibbles on the bait positioned on the hook, and pulls the hook downwardly, the spring mechanism is tripped causing a quick jerk on the line which sets the hook in the fish's mouth.

Another similar type device is shown in U.S. Pat. No. 2,530,007, wherein there is a shown a cylindrical shell or sleeve having a spring loaded shaft position therein and connected to the fishing line having a hook disposed thereon, such that once the fish nibbles on the bait, there is sufficient pressure, theoretically to trip the spring mechanism and cause the shaft to retract into the sleeve, thus setting the hook in the fish's mouth.

Another prior art patent showing still another embodiment of a fish actuated combination float and hook setting device is U.S. Pat. No. 2,818,671. Once again, the device employs a spring loaded shaft mounted within a sleeve and so constructed such that the shaft, which has a hook dangling from the lower end thereof, may be set in an extended position whereupon the tugging action of the fish against the bait on the hook will actuate the shaft to move upwardly within the float and a sudden jerking movement thereby to set the hook in the fish's mouth. Still another patent illustrating another embodiment of a similar device is U.S. Pat. No. 2,147,917. The structure of this patent once again employs an expendable spring loaded shaft mounted within a hollow cavity, the shaft being provided with means for dangling a hook down from the lower end thereof. Once again, the shaft is merely set in some extended predetermined condition whereupon activation by a fish pulling on the hook will cause the shaft to move upwardly within the sleeve thereby pulling on the hook and thereby, hopefully, setting the hook in the fish's mouth.

Still other prior art patents in this art field include U.S. Pats. Nos. 2,524,224, 2,568,999 and 3,006,102. In each of the above patents, the devices vary slightly as between the various prior art patents, but the overall concept is basically the same. The object is to provide a mechanism which, upon actuation by a fish, generally caused by the fish nibbling at the bait, the device will suddenly activate, moving the hook upwardly thereby to set the hook in the fish's mouth.

One of the difficulties which has been experienced with devices of this type is that often times, either when casting the line, or at some subsequent point in time, the spring-loaded shaft will become actuated by something other than a fish pulling on the hook and therefore, the operator would not even know that the device has been activated and is, therefore, of no further value unless the line is pulled out of the water and the device is reset.

Another problem which has become apparent by the above discussion is the fact that in most cases, the sleeve within which the spring loaded shaft is mounted is generally cylindrical or elongated, and due to the fact that the cylindrical tube is hollow and sealed off from the outer environment, it is the hollow cylinders or cylindrical tubes which act as the floaters. In many instances, the weight of the hook with the bait, as well as the sinker will cause the floater to sink under the water for a distance until it has displaced its weight in water and would therefore appear to be useless for the purpose intended, since the operator would have no way of knowing if the shaft had been actuated or not, other than by feel.

In connection with the foregoing difficulty, another difficulty which has been experienced resides in the fact that often times, the floaters or bobbers provided with these devices do not retain the fishing line and hook in the proper vertical orientation, since generally, such floats or bobbers are not provided with any fluid stabilizing means.

OBJECTS & ADVANTAGES

The principal object of the present invention is, therefore, a combined fishing bobber and hook setting mechanism which is relatively simple in structure, while nevertheless, providing signal means for indicating to the operator whether or not the spring loaded shaft of the mechanism has been activated, also when the operator momentarily absents himself from the place of fishing or if he uses several fishing lines for multiple fishing.

Still another object of this invention is to provide a combined bobber and fish hook setting mechanism wherein the bobber portion of the device is provided with stabilizing means which perform a dual stabilizing function, namely of helping the bobber to remain in a vertical oriented position in the water, and also of preventing the bobber from being pulled downwardly for a long distance after the fish has been hooked.

A further object of this invention is to provide a combined fishing bobber and hook setting mechanism having a spring loaded shaft mounted within a sleeve, the shaft having an eye hook at its lower end for supporting a fishing line and the upper portion of the shaft including shaft setting means cooperating with the sleeve, for setting the shaft in an extended position against the tension of the spring, the sleeve supporting a bobber float thereabout, in removably engageable relation, wherein an extension portion is provided extending upwardly from the top end of the sleeve and the shaft is provided with visual signal means which cooperate with the extension portion of the sleeve, thereby to provide the operator with a visual signal indicating that the spring loaded shaft has either been activated or not activated.

A further object of this invention is to provide a combined float and hook setting mechanism wherein the float or bobber portion of the mechanism is further provided with stabilizing means for facilitating and holding the mechanism in a vertically upright position, while at the same time enabling the float or bobber to resist the downward movement of the line once the fish has been hooked.

In connection with the foregoing object, it is still another object of this invention to provide a bobber and hook setting mechanism of the type described wherein the stabilizing means comprises a flange extending circumferentially about the bobber, along its approximate mid-position, the flange serving the dual purpose of helping to stabilize the device in a vertically upright position, while at the same time providing means for resisting the downward pull on the bobber when a fish has been hooked.

A further object of the invention is to provide a combined float and hook setting mechanism having means elongated to such an extend that calibration provided thereon makes possible a fairly accurate weighing of the fish.

Further features of the invention pertain to the particular arrangement of the elements and parts, whereby the above outlined and additional operating features thereof are attained.

The invention, both as to its organization and method of operation, together with further objects and advantages thereof, will best be understood by reference to the following specification taken in conjunction with the accompanying drawings, in which:

FIG. 1 is a side elevational view of the fishing bobber and hook setting mechanism of the present invention;

FIG. 2 is a side elevational, cross-sectional view of the fishing bobber and hook setting mechanism of the present invention taken in the direction of the arrows along the line 2—2 of FIG. 1;

FIG. 5 is a top cross-sectional view, showing the relationship between the coacting parts of the bobber and hook setting mechanism taken in the direction of the arrows along the line 5—5 of FIG. 2;

FIG. 6 is a bottom cross-sectional view showing the relationship between the parts of the bobber and hook setting mechanism taken in the direction of the arrows along the line 6—6 of FIG. 3;

FIG. 7 is a top cross-sectional view showing the relationship between hook setting shaft and the hook taken in the direction of the arrows along the line 7—7 of FIG. 4;

FIG. 8 is a side elevational view, partly broken away and showing, in phantom, the relationship between the hook member and the hook setting sleeve; and FIG. 9 is a top cross-sectional view showing the relationship between the hook member and the hook setting sleeve member taken in the direction of the arrows along the line 9—9 of FIG. 8.

Figure 3:
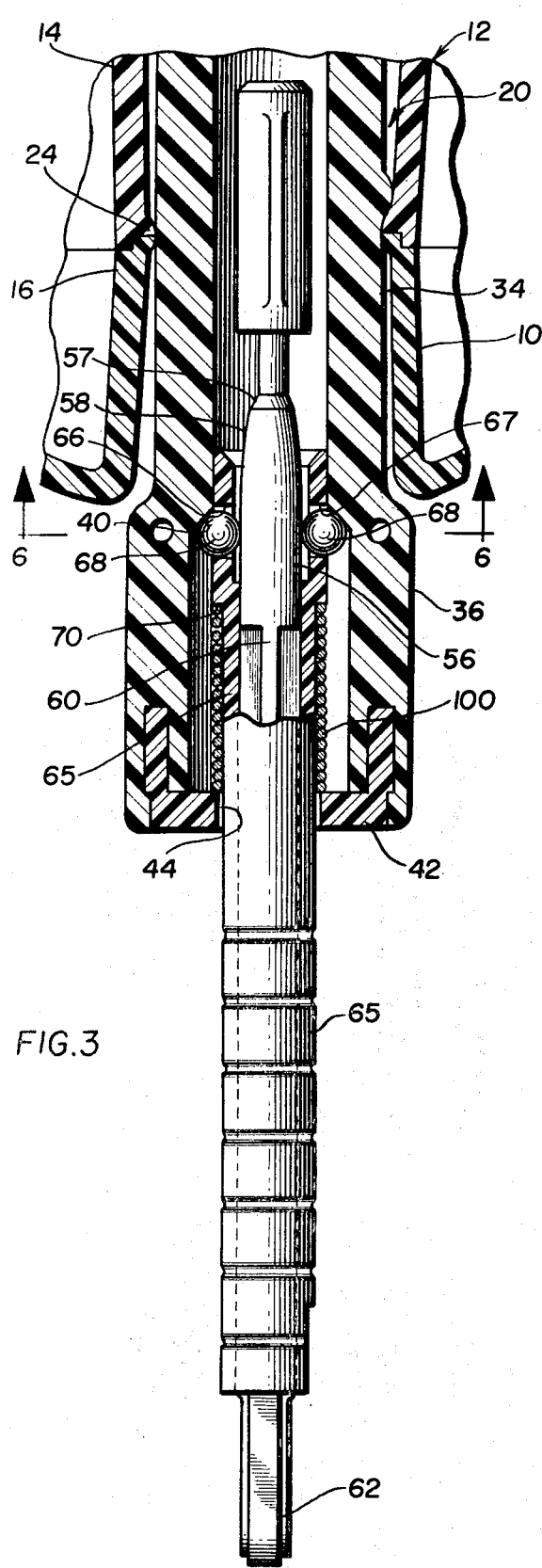
FIG. 3 is a side cross-sectional view, partly broken away viewing the details of construction of the mechanism from the rear position, the hook setting mechanism being positioned in the extended set position.

Referring now to FIGS. 1 and 2 of the drawings, the novel fishing bobber and hook setting mechanism of the present invention is illustrated, the device generally consists of a floater, generally referred to by the numeral 10, which is supported on a elongated casing 12 in removably engageable relation. The floater 10 is shown to be formed of an upper segment 14 and a lower segment 16 which are fixedly secured to each other to form the hollow floater 10, (See FIG. 2). The upper segment 14 includes a peripheral flange 15 extending around the periphery of the segment adjacent the lower end thereof, and the lower segment 16 also includes a peripheral flange 17, extending around the periphery thereof adjacent the upper portion, the peripheral flanges 15 and 17 being keyed so as to mate, thereby forming the stabilizing means in the shape of a peripheral skirt 18.

The floater 10 is shown to have a hollow mid-section 20 which accommodates the positioning of the elongated casing 12 therethrough. The upper segment 14 of the float 10 further includes a raised nib 21 circumferentially exposed about the periphery thereof and in generally horizontal alignment with the peripheral flange 15 thereof, and similarly, the lower segment 16 of the floater 10 includes a peripheral nib 22 circumferentially disposed about the periphery thereof and in generally horizontal alignment with the peripheral flange 17 thereof. The nibs 21 and 22 are constructed to mate thereby forming a lock ring 24 which cooperates with a lock nib 26 formed integrally with the elongated casing 12. Hence, in order to mount the floater 10 on the elongated casing 12, the operator slides the elongated casing 12 through the hollow mid-section 20 of the floater 10 until the lock ring 24 has passed over the lock nib 26, thereby locking the floater 10 into position on the elongated casing 12.

With regard to the details of construction of the elongated casing 12, reference may be made to FIGS. 2 through 9 of the drawings. The elongated casing 12 is generally hollow throughout its length and is formed by an upper indicator receiver section 30 which is provided with an eyelet 31 by means of which the fishing line may be connected to the device. The central portion of the indicator receiver section 30 is provided with a clear transparent window 32, which may be formed of any suitable plastic materials such as polystyrene or the like.

Immediately below the indicator receiver section 30 and formed integrally therewith, follows the central section 34 of the casing 12. The central section 34 is diametrically larger than the indicator receiver section 30 and, as indicated previously, is provided with a lock nib 26 for mounting the floater 10 thereon. It will further be noted that the internal diameter of the hollow of the central section is similarly somewhat larger than the internal diameter of the hollow of the indicator receiver section 30. Following below the central section 34 and formed integrally therewith is an enlarged base section 36 wherein both the external diameter, as well as the internal diameter of the hollow formed therein is larger than the external diameter and internal diameter of the central section 34. The point of juncture between the central section 34 and the base section 36 is provided with a shoulder 38 which acts as a stop for the floater 10 when the same is positioned on the central section 34 of the casing 12. The point of juncture between the internal hollow of section 34 and the internal hollow of base section 36 is formed into a truncated cone portion 40 which functions as a stop position for the indicator shaft in a manner to be more fully described hereinafter. The lower portion of the base section 36 is closed by means of a cap 42 which is provided with a central aperture 44 to accommodate therethrough a housing sleeve, as again will be more fully explained hereinafter.

Along the external portion of the base section 36 is provided an eyelet 37 which is positioned immediately below the shoulder 38. The eyelet 37 provides a convenient line guide for the fishing line whereby the fishing line may be strung from the upper eyelet 31 across the floater 10, and through the eyelet 37, after which the line is then strung through the hook member 62. In this manner, the fishing line is prevented from entangling itself around any portion of the device generally, or any other object. The manner in which a fishing line would be strung through the eyelets 31 and 37 respectively, and through the hook member 62 is depicted in FIG. 1 of the drawings.

The device is completed by the indicator and hook setting mechanism generally referred to by the numeral 50 which is positioned in the internal hollow of the elongated casing 12. This mechanism generally includes an indicator and hook setting shaft 52 which is generally molded of a plastic material and is formed as an integral piece but formed of various sections. The upper portion of the shaft 52 is formed into an indicator head 54 which, in the actuated position of the assembly, rests within the transparent window 32 of the indicator receive section 30. Spaced downwardly from the indicator head 54 is the shaft positioning head 56. The indicator head 54 and shaft positioning head 56 are spaced apart by a section of the shaft 52, which is of smaller diameter than either of the indicator head 54 and shaft positioning head 56. The shaft positioning head 56 is provided with a bevelled leading edge 57, the shaft positioning head 56 presenting an arcuately shaped surface 58 extending downwardly from the bevelled leading edge 57 to a point approximately mid-way down the length of the head 56, thereafter the shaft positioning head 56 presenting a circular diameter.

Extending downwardly from the shaft positioning head 56 is the connecting rod 60 which connects the shaft positioning head 56 with the terminal hook member 62. The terminal hook member 62 is constructed so as to accommodate the attachment of the fishing line thereto, the fishing hook being disposed on the line at a point positioned downwardly from the terminal hook member 62 which will actuate the mechanism in a manner to be described more fully hereinafter.

The indicator and hook set shaft 52 is completely encased within a housing sleeve 65, the indicator and hook set shaft 52 including the indicator head 54 and the shaft positioning head 56 being slidably movable within the housing sleeve 65. In turn, the housing sleeve 65 is diametrically constructed so as to be movable within the hollow of the elongated casing 12. The upper portion of the housing sleeve 65 is diametrically only slightly smaller than the internal diameter of the hollow of the elongated casing 12, and includes a pair of opposed apertures 66 and 67 respectively, each of which houses a ball bearing 68. A short distance below the opposed apertures 66 and 67, the housing sleeve 65 is provided with an undercut forming a shoulder 70, which provides the upper rest position for a coiled spring 100. The remaining length of the housing sleeve 65 is of a reduced outer diameter, thereby to accommodate the positioning of the coiled spring 100 between the outer surface of the housing sleeve 65 and the internal surface of the hollow extending throughout the length of the elongated casing 12. The lower portion of the spring 100 rests against the peripheral lip of the aperture 44 positioned in the end cap 42, all in the manner as shown in FIGS. 2 through 4 of the drawings.

The operation of the mechanism necessarily requires that the housing sleeve 65 be freely movable within the hollow of the elongated casing 12, and that the indicator and hook setting shaft 52 be completely movable within the hollow of the housing sleeve 65. The internal configuration of the housing sleeve 65, and the structural features of the indicator and hook setting shaft 52 coact with the ball bearings 68 to provide a series of two stop positions for the housing sleeve 65 and indicator and hook setting shaft 52 within the elongated casing 12.

Figure 4:
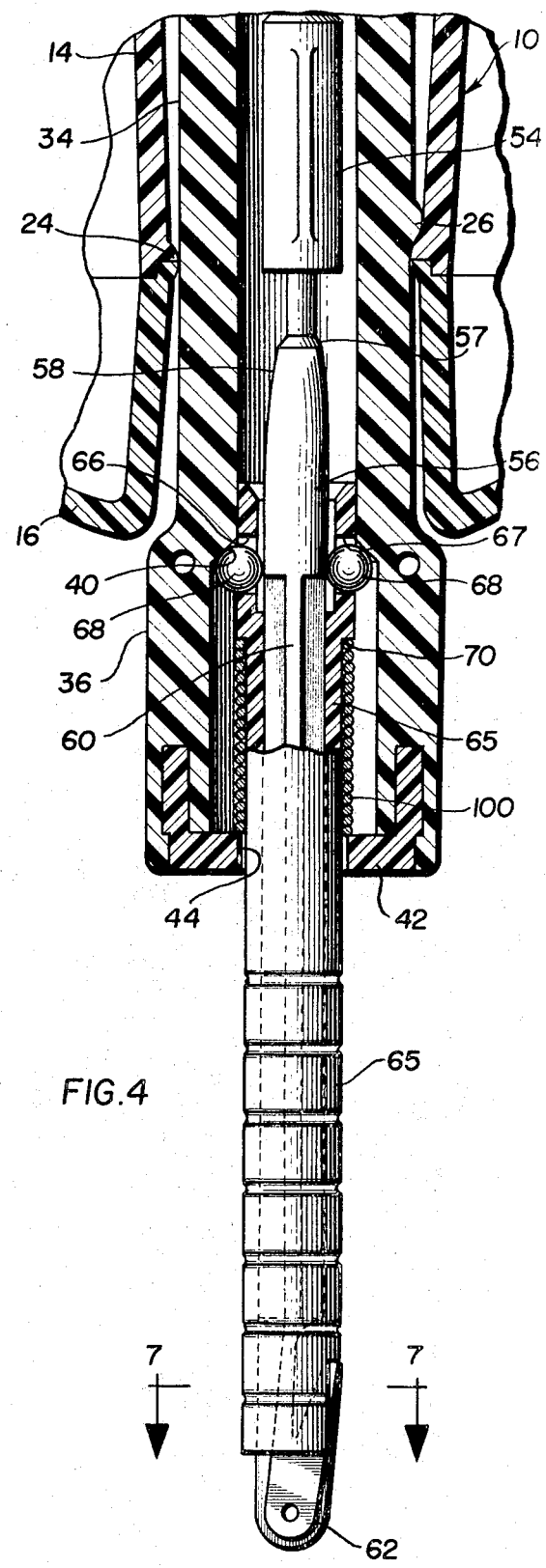
FIG. 4 is a side cross-sectional view, partly broken away showing the details of construction of the fish bobber and hook setting mechanism from the side position, with the hook setting mechanism in the extended set position.

With particular reference to FIGS. 3 through 6 of the drawings, the operation of the device is more fully illustrated. In order to set the indicator and hook setting shaft in its extended position, the operator need only grasp the housing sleeve 65 and withdraw the same downwardly from the elongated casing at 12 which, in turn, retracts the coiled spring 100. As the housing sleeve 65 is withdrawn from the casing 12, the ball bearing 68 will ride along the internal surface of the casing 12 until the ball bearings 68 ride into the truncated cone portion 40 formed in the casing 12. At that point, the coiled spring 100 will have been retracted into its completely coiled position, the upper end of the coiled spring 100 still resting against the shoulder 70 and the lower end of the coiled spring 100 resting against the peripheral lip surrounding the aperture 44 in the end cap 42. To set the housing sleeve 65 in that position, the operator then pushes the indicator and hook setting shaft 52 upwardly, thereby causing the shaft positioning head 56 to ride upwardly with respect to the ball bearings 68. This movement is facilitated by the bevelled leading edge 57 of the shaft positioning head 56 and the arcuately shaped surface 58 of the shaft positioning head 56 riding along the surface of the ball bearings 68. As the shaft positioning head 56 is moved upwardly, it will be noted that the full circular diameter portion of the shaft positioning head 56 now bears against the ball bearings 68 thereby to hold the ball bearings 68 in an extended position extending outwardly from the opposed apertures 66 and 67 and within the truncated cone portion 40 of the casing 12, as more fully shown in FIG. 4 of the drawings. It will also be noted that the indicator head 54, in this position, is completely withdrawn within the hollow of the elongated casing 12 and therefore, the transparent window 32 in the indicator receiver section 30 of the casing 12 will be empty. As was indicated previously, the fishing line is wrapped about the terminal hook member 62 and extends downwardly therefrom. Hence, when a fish grabs the bait which is positioned on the fishing hook 80 (FIG. 1) the tendency is to pull downwardly on the terminal hook member 62 causing a concomitant downward movement of the indicator and hook setting shaft 52. It will become apparent that this motion causes a downward movement of the shaft positioning head 56 with respect to the ball bearings 68, and as the shaft positioning head 56 moves downwardly, the ball bearings will have the tendency to ride along the arcuate surface 58 thereof until the same meet the bevelled leading edge 57 thereof, and ultimately will meet the reduced diameter portion of the shaft 52 interposed between the indicator head 54 and the shaft positioning head 56. When this position has been attained the pressure exerted by the surface of the truncated cone portion 40 will have the tendency to push the ball bearings 68 into the respective apertures 66 and 67 thereby releasing the housing sleeve 65 from its locked position as shown in FIG. 4 of the drawings. Thereafter, the coiled spring 100 will immediately force the housing sleeve 65 upwardly, in effect causing the upward movement of both the housing sleeve 65 and the indicator and hook setting shaft 52. This sudden movement of the sleeve 65 and indicator and hook setting shaft 52 will pull upwardly on the fishing hook 80, thereby to set the hook in the fish's mouth after which the operator may commence reeling in the fish.

It will also be apparent that once the device has been actuated as indicated above, the indicator head 54 of the indicator and hook setting shaft 52 will have moved upwardly to its fullest extent whereby the indicator head 54 will now be positioned within the transparent window 32 of the indicator receiver section 30. Hence, once the operator visually views the indicator head 54 within the transparent window 32, he will be aware that either a fish or for some other reason, the device has been actuated and he must either reel in a fish or reel in the line to reset the device. Ideally, and in the preferred embodiment, the indicator head 54 is formed of a colored plastic material, such that it is easily observable from a distance as the operator views the bobber assembly.

Another advantage achieved by virtue of the present invention relates to the fluid brake and stabilizing skirt 18. As indicated above, the concept of the present invention is to cause the fish to bite on the bait positioned on the fishing hook 80 thereby to cause a sudden downward movement of the indicator and hook setting shaft 52 in order to actuate the device. Obviously, this action will have a tendency to pull the floater 10 beneath the surface of the water and thereby obscure the indicating features of the invention. It has been found that by providing the peripheral skirt 18, the same acts as a stabilizing skirt and resists the action tending to pull the floater 10 beneath the surface of the water. In addition, the skirt 18 tends to stabilize the floater in the upright position whereby the transparent window 32 will remain above the surface of the water in a vertical configuration facilitating the ability of the operator to observe when the device has been actuated. This coaction is especially desirable when the operator employs additional fishing paraphernalia such as sinkers and heavier fishing lures. It will therefore be appreciated that by having a fluid brake and stabilizing skirt 18 associated with the floater 10, the device is better able to withstand the weight generally associated with a sinker and fishing lure and ensure that the device will remain in a vertical disposition above the surface of the water.

Still another advantage obtained by virtue of the construction of the bobber assembly of the present invention resides in the fact that the floater 10 may be completely removed from the casing 12, where for example, the operator desires to utilize the device in deep water fishing. In such an event, the floater 10 is completely removed by simply riding the lock ring 24 over the lock nibs 26 and thereafter, attaching his fishing line through the eyelet 31 and terminal hook 62. In such an event, the operator is not as desirous of utlizing the indicator functions of the mechanism, but rather, is merely attempting to use the hook setting mechanism per se. In any event, the removability feature of the floater 10 presents another desirable function of the mechanism as a whole.

Finally, again, in the ideal and preferred embodiment, the housing sleeve 65 may have appropriate indicia marked along the outside surface thereof, and calibrated in accordance with the tensional forces of the coiled spring 100, whereby the operator may actually weigh the fish which has been caught at least up to the maximum tension which is afforded by the coiled spring 100. Hence, once a fish has been caught, the fishing line with the fish attached is brought adjacent to the terminal hook member 62 and the bobber is then raised by the operator with the fish dangling therebelow. In the usual case, the tensional force of the average coiled spring 100 will be able to measure a fish up to approximately 2 lbs. in weight and it is apparent that when the operator has raised the bobber with the fish dangling therebelow, the housing sleeve 65 will be pulled downwardly by the weight of the fish. Assuming that the fish does not weigh in excess of 2 lbs., the operator may fairly accurately weigh the fish which has been caught.

It will be appreciated that there has been provided by virtue of this invention a combination bobber and hook setting mechanism which effectively operates and functions to set a hook in a fish which has taken the bait or the lure at the end of the fishing line, while at the same time providing indicator means to indicate that the device has been actuated when the fish has taken the bait. In addition, the device of the present invention provides a novel stabilizing means in the form of a peripheral skirt which functions to keep the device in a vertically upright position and further tends to resist the downward pull on the device when a fish has taken the bait. In this manner the indicator device associated with the invention will have the tendency to remain above the surface of the water, in order to afford the operator the opportunity to observe visually, that the device has been actuated. It is therefore appreciated that all of the above objects and advantages have been accomplished by means of the combined bobber and hook setting mechanism of the present invention as illustrated herein.

While there has been described what is at present considered to be the preferred embodiment of the invention, it will be understood that various modifications may be made therein and it is intended to cover in the appended claims all such modifications as fall within the true spirit and scope of the invention.

I claim:

1. A combined fishing bobber and hook setting mechanism having a spring-loaded shaft mounted within a sleeve, the shaft having an eye hook at its lower end for supporting a fishing bobber therethrough and the upper portion of the shaft, including shaft setting means, which cooperate with the sleeve for setting the shaft in an extended position against the tension of the spring, the sleeve supporting a bobber float thereabout in removably engageable relation, the improvement comprising in combination, an extension portion extending upwardly from the top end of the sleeve, said extension portion being formed from a clear plastic material thereby to be transparent, signal means operatively connected to the shaft and cooperating with the extension portion of the shaft, said signal means comprising a head mounted on and coextensive with the upper portion of the shaft whereby actuation of the shaft casues upward movement of the shaft within the sleeve so that the upper portion of the shaft moves into said transparent extension portion thereby to provide a visual signal indicating actuation of the spring loaded shaft, said upper portion of said shaft being color coded so as to present a visual color signal upon activation of the shaft, the bobber further including means for stabilizing the bobber in an upright position and resisting the downward pull upon actuation of the shaft, said stabilizing means comprising a flange extending circumferentially about the bobber at its approximate mid-position, the diameter of said flange determining the resistance to the downward pull on the mechanism by the weight of the attached fishing lures and the weight of the fish, and the sleeve being elongated to provide space for indicia marking thereon, calibrated in accordance with the tensional forces of an elongated coiled spring whereby the operator may weigh the fish once caught.

* * * * *